US010435102B2

(12) United States Patent
White (10) Patent No.: US 10,435,102 B2
(45) Date of Patent: Oct. 8, 2019

(54) RECUMBENT BICYCLE WITH DIRECT UNDERSEAT STEERING

(71) Applicant: Chapin Del Sol White, Takoma Park, MD (US)

(72) Inventor: Chapin Del Sol White, Takoma Park, MD (US)

(*) Notice: Subject to any disclaimer, the term of this patent is extended or adjusted under 35 U.S.C. 154(b) by 56 days.

(21) Appl. No.: 15/679,037

(22) Filed: Aug. 16, 2017

(65) Prior Publication Data

US 2019/0054971 A1    Feb. 21, 2019

Related U.S. Application Data

(60) Provisional application No. 62/376,124, filed on Aug. 17, 2016.

(51) Int. Cl.
*B62K 3/00* (2006.01)
*B62K 21/02* (2006.01)
*B62K 21/12* (2006.01)
*B62K 19/32* (2006.01)
*B60T 1/06* (2006.01)
*F16D 55/224* (2006.01)
*F16D 65/18* (2006.01)

(52) U.S. Cl.
CPC ............... *B62K 3/005* (2013.01); *B60T 1/06* (2013.01); *B62K 19/32* (2013.01); *B62K 21/02* (2013.01); *B62K 21/12* (2013.01); *F16D 55/2245* (2013.01); *F16D 65/183* (2013.01)

(58) Field of Classification Search
CPC .......... B62K 21/12; B62K 19/32; B62K 3/005
See application file for complete search history.

(56) References Cited

U.S. PATENT DOCUMENTS

| | | | | |
|---|---|---|---|---|
| 4,283,070 A | * | 8/1981 | Forrestall | B62K 21/18 280/220 |
| 4,333,664 A | * | 6/1982 | Turner | B62K 3/005 280/261 |
| D278,324 S | * | 4/1985 | Breen | 280/288.1 |
| 4,527,811 A | * | 7/1985 | DeMoss | B62K 21/00 248/429 |
| 4,618,160 A | | 10/1986 | McElfresh | |
| 4,659,098 A | * | 4/1987 | Jacobson | B62K 3/005 280/220 |
| 4,778,192 A | | 10/1988 | McElfresh | |
| 4,878,684 A | * | 11/1989 | Lemle | B62K 3/005 280/288.1 |
| 4,925,203 A | | 5/1990 | Buckler | |
| 5,620,196 A | | 4/1997 | Belik | |

* cited by examiner

*Primary Examiner* — Michael C McCullough (57) ABSTRACT

The invention allows a rider to operate a bicycle in a recumbent position, and steer the bicycle using a direct underseat steering system. The recumbent position, compared to the typical upright riding position, greatly reduces air resistance and required effort. The direct underseat steering system is mechanically simple, which makes is less costly to manufacture, and the direct steering system is also less likely than linkage-based systems to be damaged in a crash. The frame geometry allows the manufacturer to use inexpensive materials and techniques, while still providing the rider adequate stiffness and durability.

5 Claims, 8 Drawing Sheets

RECUMBENT BICYCLE WITH DIRECT UNDERSEAT STEERING

REFERENCE TO RELATED APPLICATIONS

This application claims an invention which was disclosed in Provisional Application Number 62/376,124, filed Aug. 17, 2016, entitled "Recumbent Bicycle with Direct Underseat Steering". The benefit under 35 USC § 119(e) of the United States provisional application is hereby claimed, and the aforementioned application is hereby incorporated herein by reference.

ACKNOWLEDGMENT OF GOVERNMENT SUPPORT

Not applicable

BACKGROUND OF THE INVENTION

Field of the Invention

The invention pertains to the field of human-powered transportation. More particularly, the invention pertains to recumbent vehicles.

DESCRIPTION OF RELATED ART

The advantages of recumbent bicycles over traditional upright bicycles are well known. Due to the lower riding position, recumbents produce less wind resistance than uprights. And, recumbents can be substantially more comfortable than uprights, due to a reclining position and a seating area that spreads the rider's weight over a much larger area.

Despite these inherent advantages, recumbents continue to represent only a small niche in the larger bicycle industry. There are several categories of reasons for the limited appeal of current recumbent designs.

Unwieldiness. For commuters and riders in urban settings, maneuverability and light weight are important. But, two major classes of recumbent bicycles—long wheelbase designs, and tricycles—are difficult to operate in narrow spaces.

Cost. The retail price of recumbent bicycles exceeds the willingness and ability to pay of an average bicycle rider. The high prices for recumbents are partly due to their design and partly due to low sales volumes. Examples of design elements that increase costs include differently sized front and rear wheels, complex steering mechanisms (e.g., underseat steering with cable- or rod-driven linkages), two-stage transmissions, and boom-style frames that require high-performance materials.

Inefficiency. In general, the "efficiency" of a bicycle refers to the amount of forward motion generate per unit of work effort. Although reduced wind resistance increases the efficiency of recumbent bicycles, other aspects of recumbent bicycles can reduce their efficiency. In high-handlebar recumbent designs, or designs with linkage-based underseat steering, the recumbent rider can only apply limited effort from their arms and back. Also, complex chain paths (e.g. two-stage transmissions, or idler wheels) increase friction and reduce efficiency.

Social unacceptability. Recumbent bicycles, and their riders, are perceived as strange, and there is a widespread (and somewhat deserved) perception of recumbents as being dangerous due to poor visibility to drivers. The regulations of cycle racing's governing bodies also perpetuate the traditional upright diamond frame.

The goal of the present invention is to create a bicycle that enjoys the full advantages inherent in recumbent design, while avoiding the key pitfalls. The short wheelbase design allows for high maneuverability and everyday riding in urban situations. The geometry allows for simple construction with common materials and off-the-shelf parts, which will make the bicycle affordable for a wide range of riders. The steering mechanism allows the rider to ride with arms in a straight or locked position, and use his arms and back to propel the bicycle. The steering mechanism is also mechanically simple and durable, and highly responsive to the rider's input. The chain path is simple and efficient, and is compatible with common internally geared hubs.

Of interest to the present invention are several existing disclosures. Turner et al., U.S. Pat. No. 4,333,664, discloses a recumbent bicycle with direct underseat steering, which was marketed as the "Hypercycle." The Hypercycle has been criticized for an excessively short wheelbase that places the rider's weight too far forward, thereby creating unsafe riding conditions when braking heavily or going over rough terrain. McElfresh et al., U.S. Pat. Nos. 4,778,192 and 4,618,160, discloses a short wheelbase recumbent bicycle that has a better weight distribution than Turner et al., but that relies on a complicated chain path and a complicated steering linkage system.

Buckler et al., U.S. Pat. No. 4,925,203, discloses a bicycle with direct underseat steering and a simple chain path. The key shortcoming of Buckler et al. is that the wheelbase is even shorter and the front wheel is even smaller than Turner et al., which exacerbates the safety risks and makes the bicycle unsafe and inefficient for many purposes. Belik et al., U.S. Pat. No. 5,620,196, discloses a recumbent bicycle that, in its main embodiment, has a simple chain path, although the frame design puts the rider in a substantially vertical position which creates aerodynamic inefficiency. Belik et al.'s alternative embodiment achieves greater aerodynamic efficiency, but requires a more-complex chain path.

The key insight behind the current invention is that placing the seat immediately above the upper chain path (i.e. the path from the front chainring to the rear sprocket) solves several problems—it allows a simple and efficient chain path (i.e. without an idler wheel), and, at the same time, also allows a full-size front wheel and wheelbase that is long enough to ensure safety and stability. In conventional upright bicycle design the handlebar is connected to the front forks by a stem that is attached to the top of the head tube, but that arrangement does not allow placement of the seat immediately above the chain. In order to place the seat immediately above the chain, the handlebar rotate below the upper chain path and must be attached to the front forks in a way that is different from conventional upright bicycle design, and that is what is described in this disclosure.

SUMMARY OF THE INVENTION

DETAILED DESCRIPTION OF THE INVENTION

Figure 1:
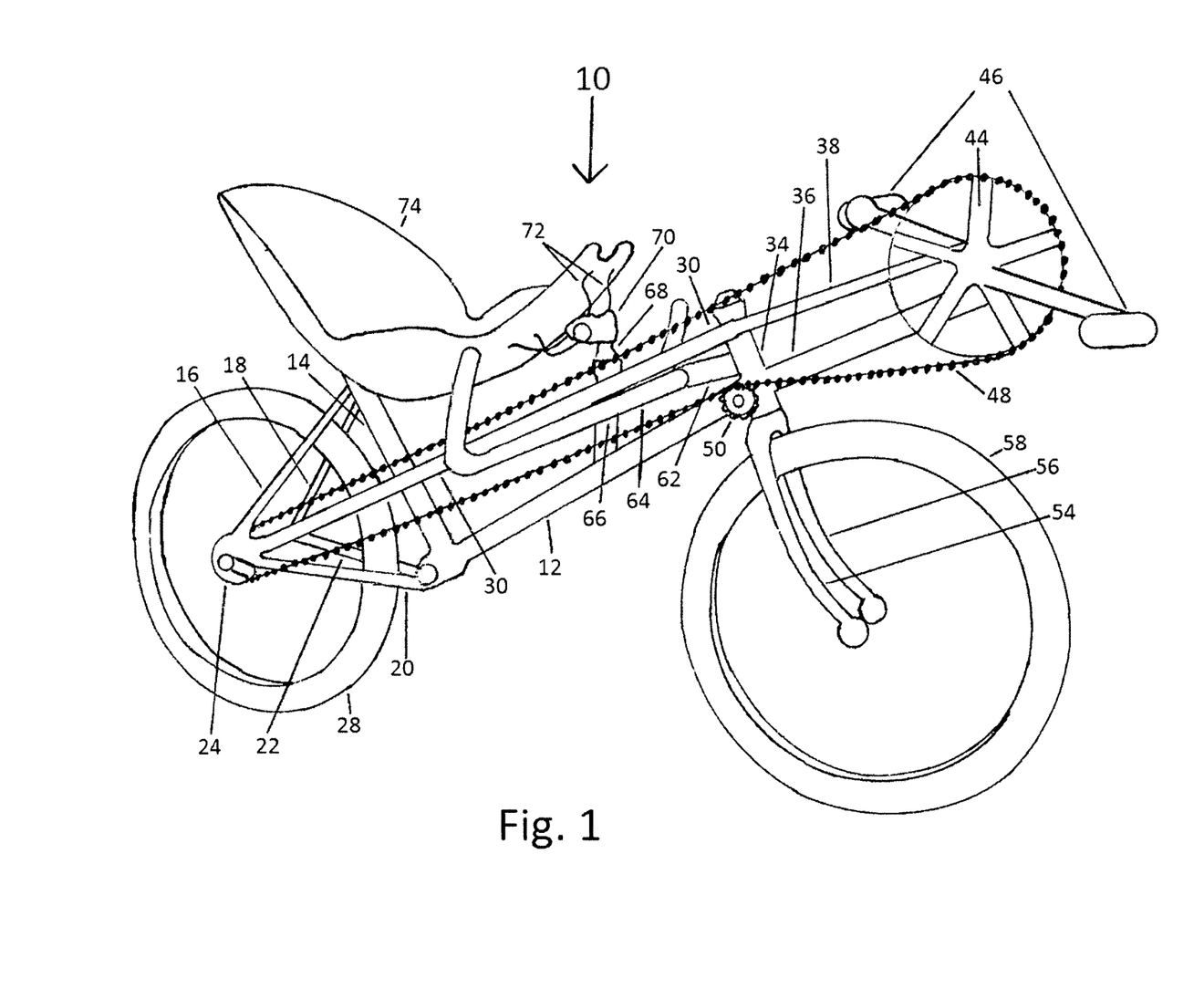
FIG. 1—a right side perspective view of an example vehicle
Figure 4:
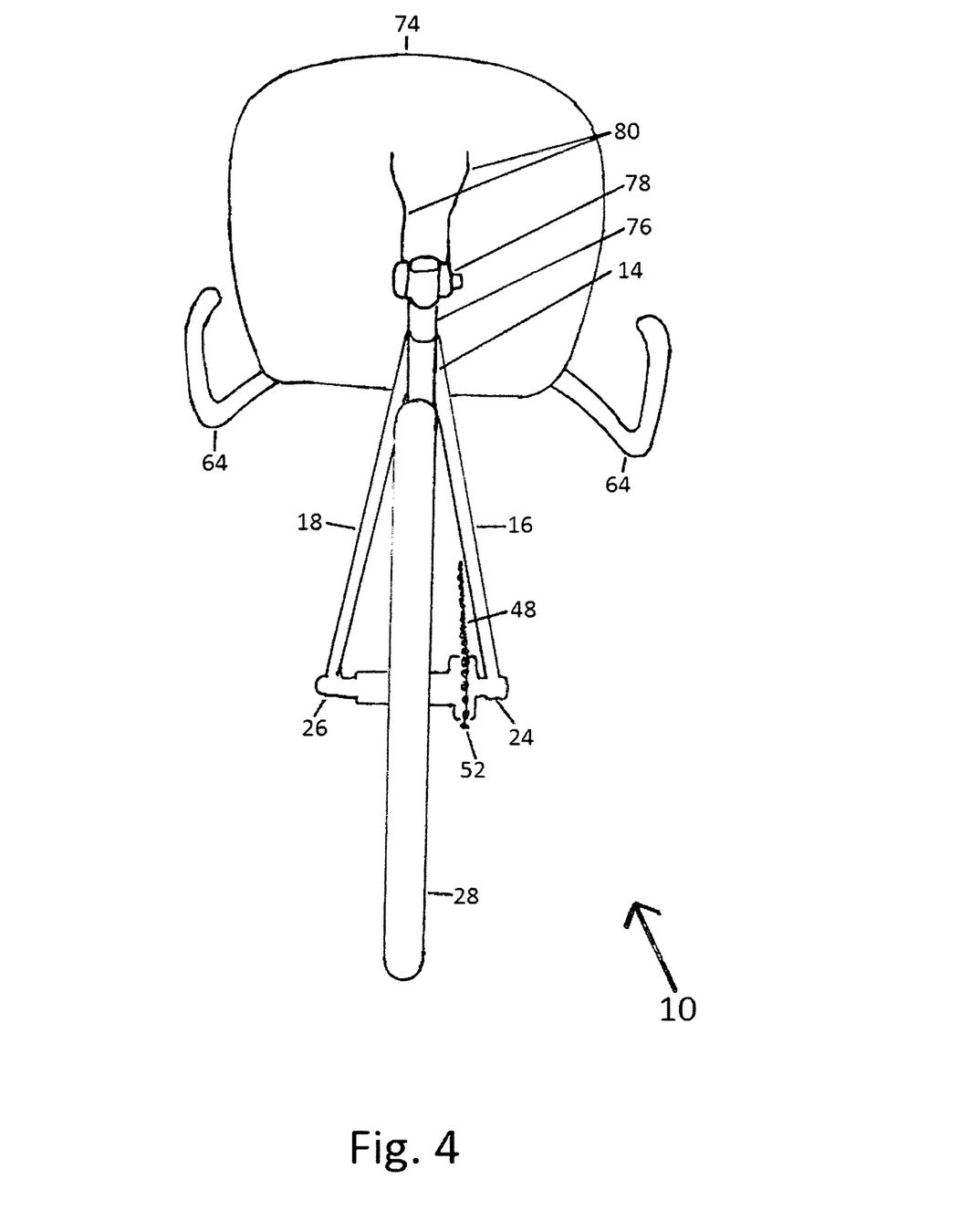
FIG. 4—a rear side elevation view of an example vehicle

A recumbent bicycle 10 of this invention is shown in FIG. 1. As shown in FIG. 1, a down tube 12 is connected to a rear seat tube 14. The lower end of the rear seat tube 14 is connected to the right rear dropout 24 by a right chain stay 20. The lower end of the rear seat tube 14 is also connected to the left rear dropout 26 by a left chain stay 22. As shown in FIG. 1 and FIG. 4, the upper right end of the rear seat tube 14 is connected to a right rear dropout 24 by a right seat stay 16. The upper left end of the rear seat tube 16 is also connected to a left rear dropout 26 by a left seat stay 18. The rear wheel and tire 28 are removably connected to the right rear dropout 24 and the left rear dropout 26.

A right main side stay 30 is connected to the right rear dropout 24 and connected to the right side of the rear seat tube 14 and connected to the right side of the front seat tube 66 and connected to the right side of the head tube 34 and connected to the rear end of the right front side stay 38. A left main side stay 32 is connected to the left rear dropout 26 and connected to the left side of the rear seat tube 14 and connected to the left side of the front seat tube 66 and connected to the left side of the head tube 34 and connected to the rear end of the left front side stay 40.

Figure 2:
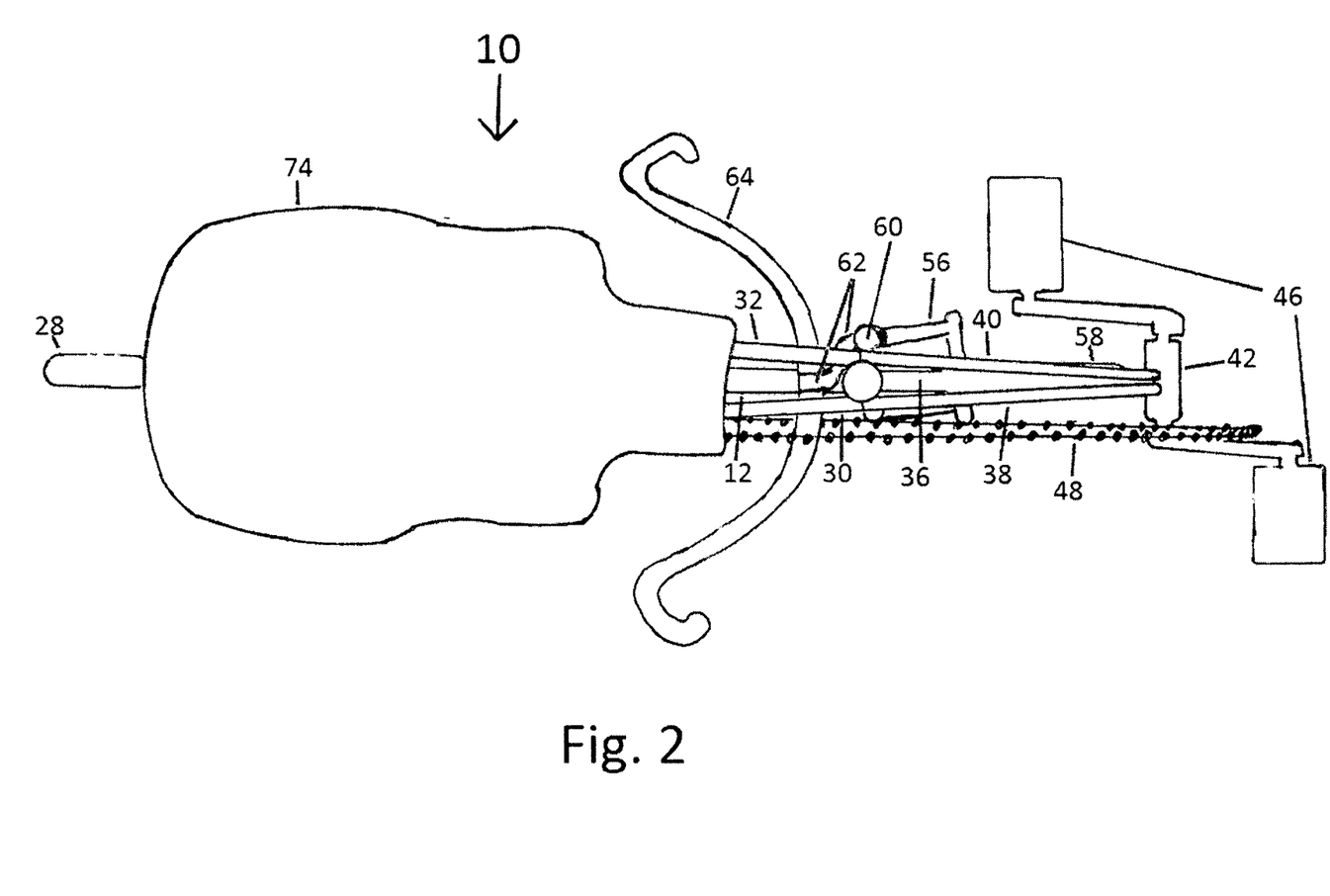
FIG. 2—a top side elevation view of an example vehicle
Figure 3:
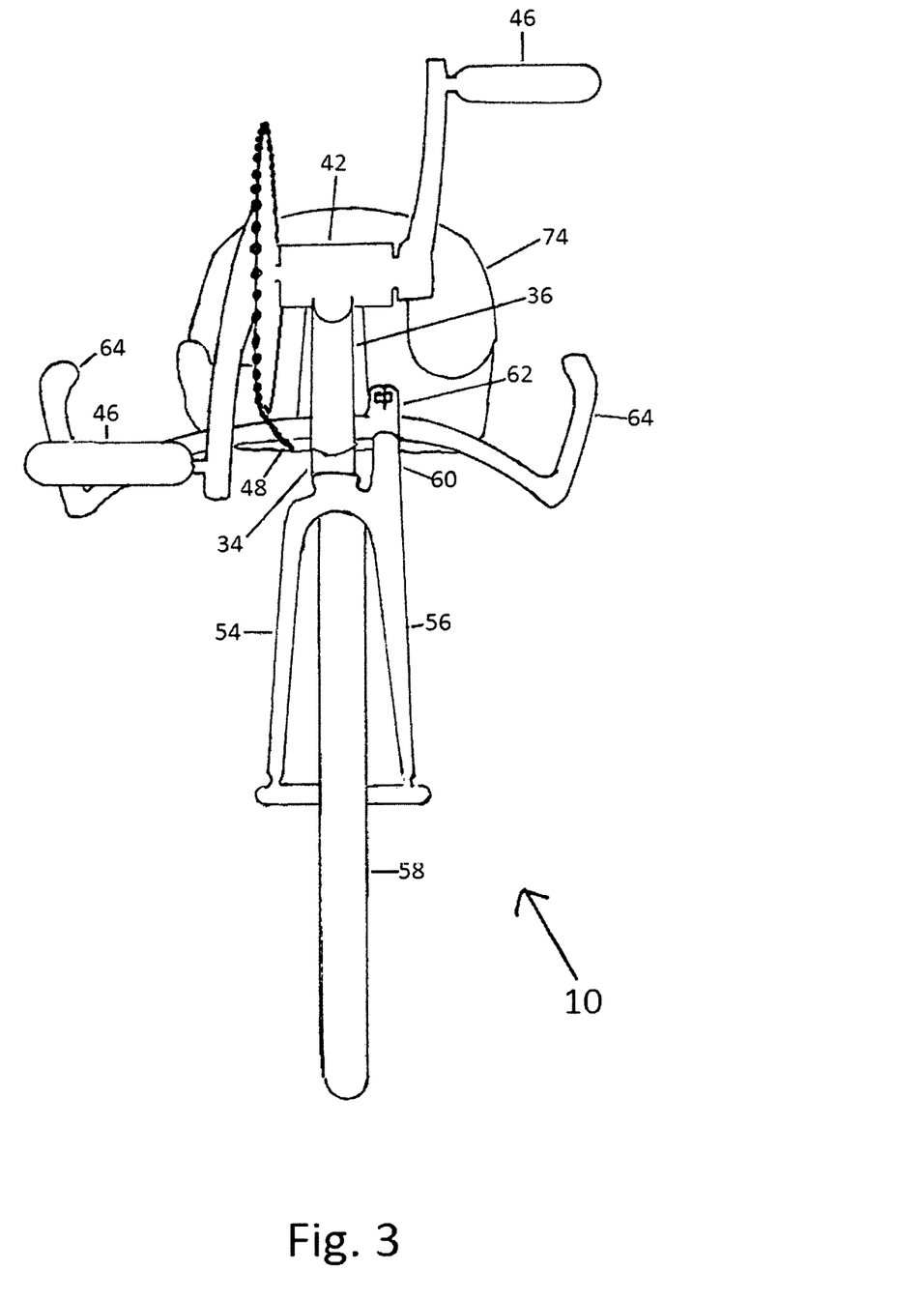
FIG. 3—a front side elevation view of an example vehicle

As shown in FIG. 1 and FIG. 2 and FIG. 3, a front down tube 36 connects the front center of the head tube 34 to the underside of the bottom bracket shell 42. The rear end of the right front side stay 38 is connected to the front end of the right main side stay 30 and the upper right side of the head tube 34. The front end of the right front side stay 38 is connected to the right upper side of the bottom bracket shell 42. The rear end of the left front side stay 40 is connected to the front end of the left main side stay 32 and the upper left side of the head tube 34. The front end of the left front side stay 40 is connected to the left upper side of the bottom bracket shell 42. The bottom bracket shell 42 is rotatably connected to a chainring 44 and pedals and crankarms 46.

Figure 5:
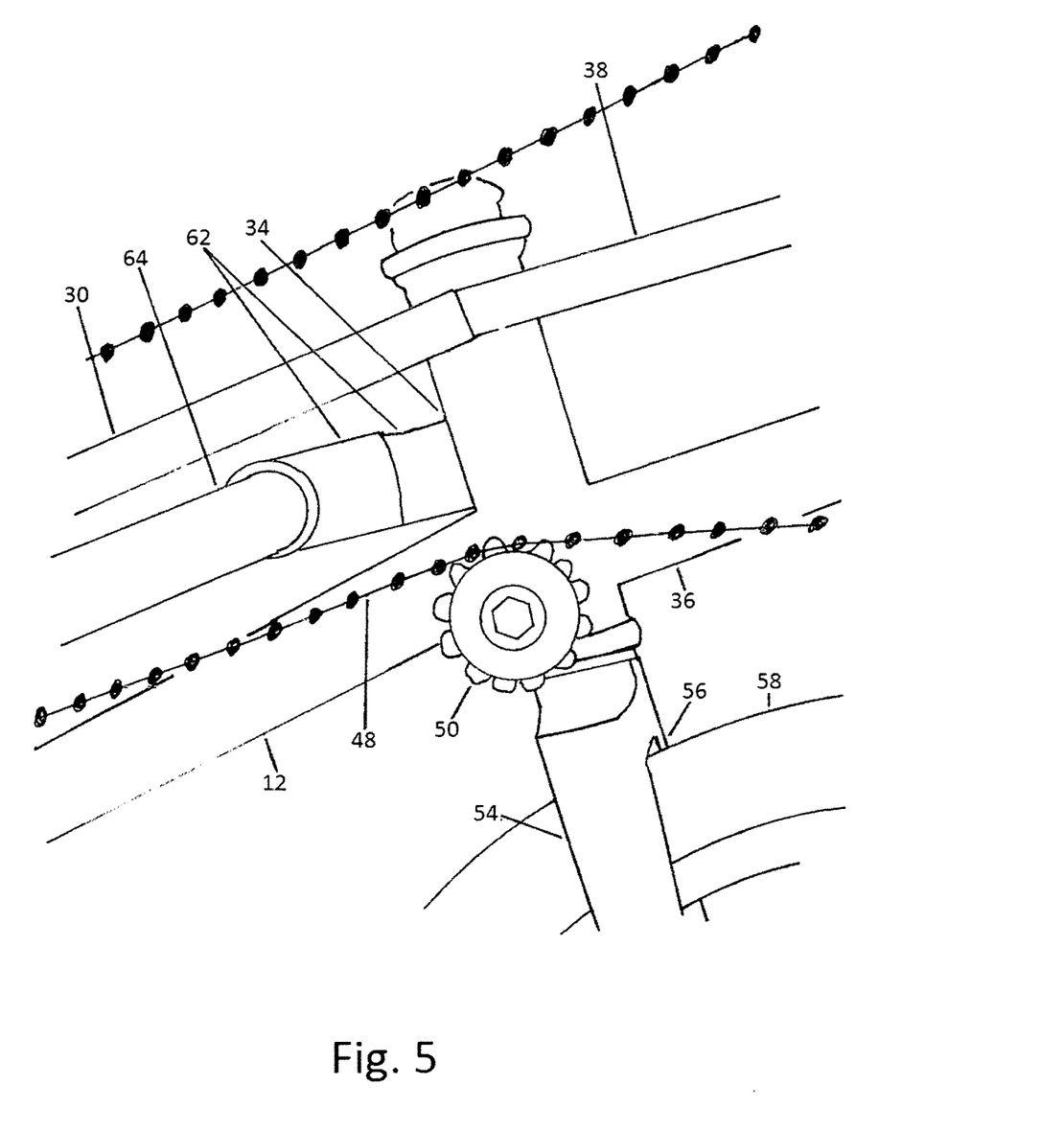
FIG. 5—a partial right side view of the jockey wheel and steering assembly

As shown in FIG. 5, a jockey wheel 50 is connected to the lower right side of the head tube 34. A chain 48 passes around the chainring 44 then over the top of the jockey wheel 50 then around the rear sprocket 52 then back to the chainring 44. The right front fork 54 is connected to the left front fork 56 and both forks are removably connected to a front wheel and tire 58. The right front fork 54 and left front fork 56 are rotatably connected to the head tube 34.

Figure 6:
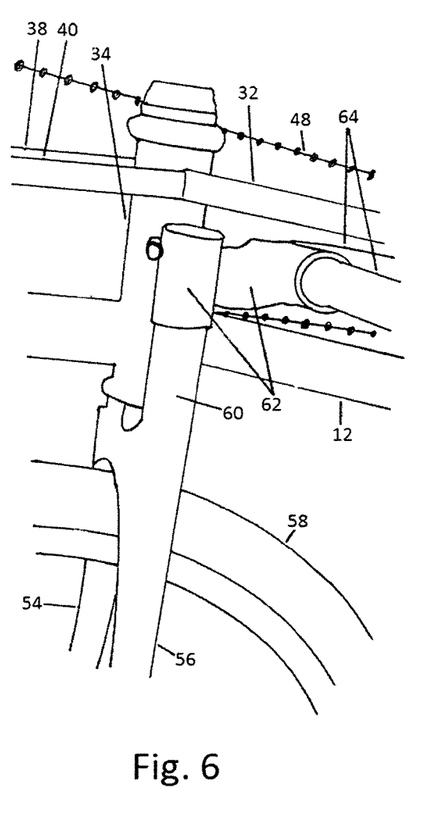
FIG. 6—a partial left side view of the steering assembly with the front wheel turned to the right FIG. 7—a partial left side view of the steering assembly with the front wheel turned to the left FIG. 8—a partial view of the front seat mount FIG. 9—a partial view of the rear seat mount
Figure 7:
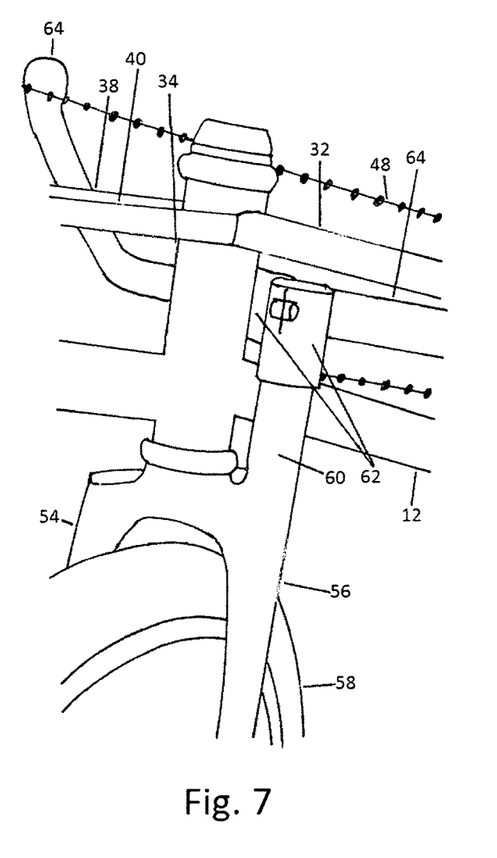

As shown in FIG. 6 and FIG. 7, the left front fork 56 is connected to a vertical fork extender stem 60 that, when the bicycle is assembled, runs parallel to the head tube 34. The left end of wraparound connector 62 slips over and is removably clamped to the vertical fork extender stem 60. The rear end of the wraparound connector 62 slips around and is removably clamped to the handlebar 64. The wraparound connector 62 is shaped and positioned on the vertical fork extender stem 60 and clamped to the handlebar 64 in an arrangement that ensures that the right front fork 54 and left front fork 56 can rotate freely without interfering with the chain 48 or the down tube 12 or the right main side stay 30 or the left main side stay 32.

Figure 8:
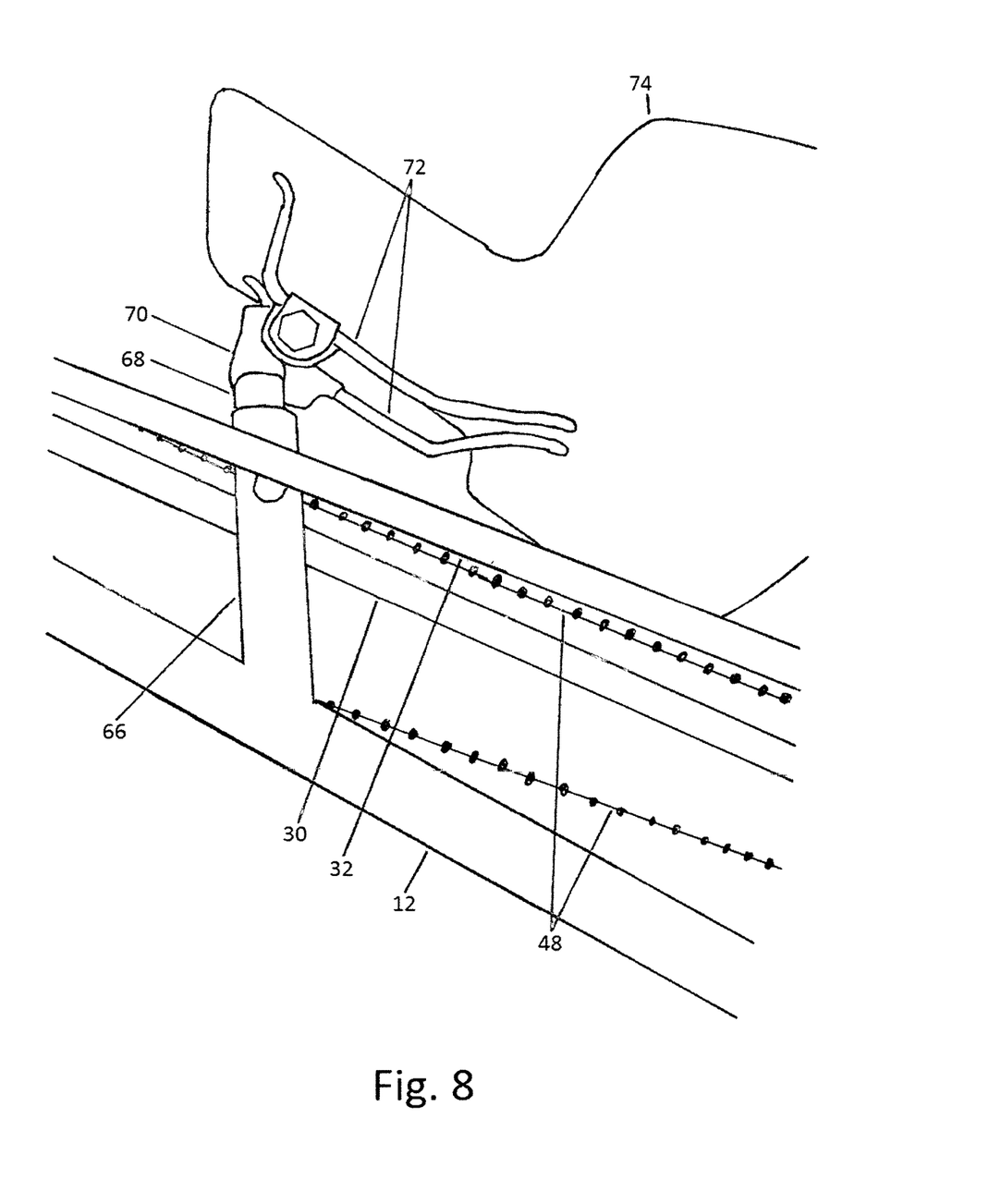

As shown in FIG. 8, the front seat tube 66 is connected to the down tube 12 and connected to the right main side stay 30 and connected to the left main side stay 32. A front seat post 68 is inserted into and removably clamped to the front seat tube 66. The front seat post 68 is removably clamped to a front seat clamp 70 which is removably clamped to the front seat rails 72. The front seat rails 72 are connected to the seat 74.

Figure 9:
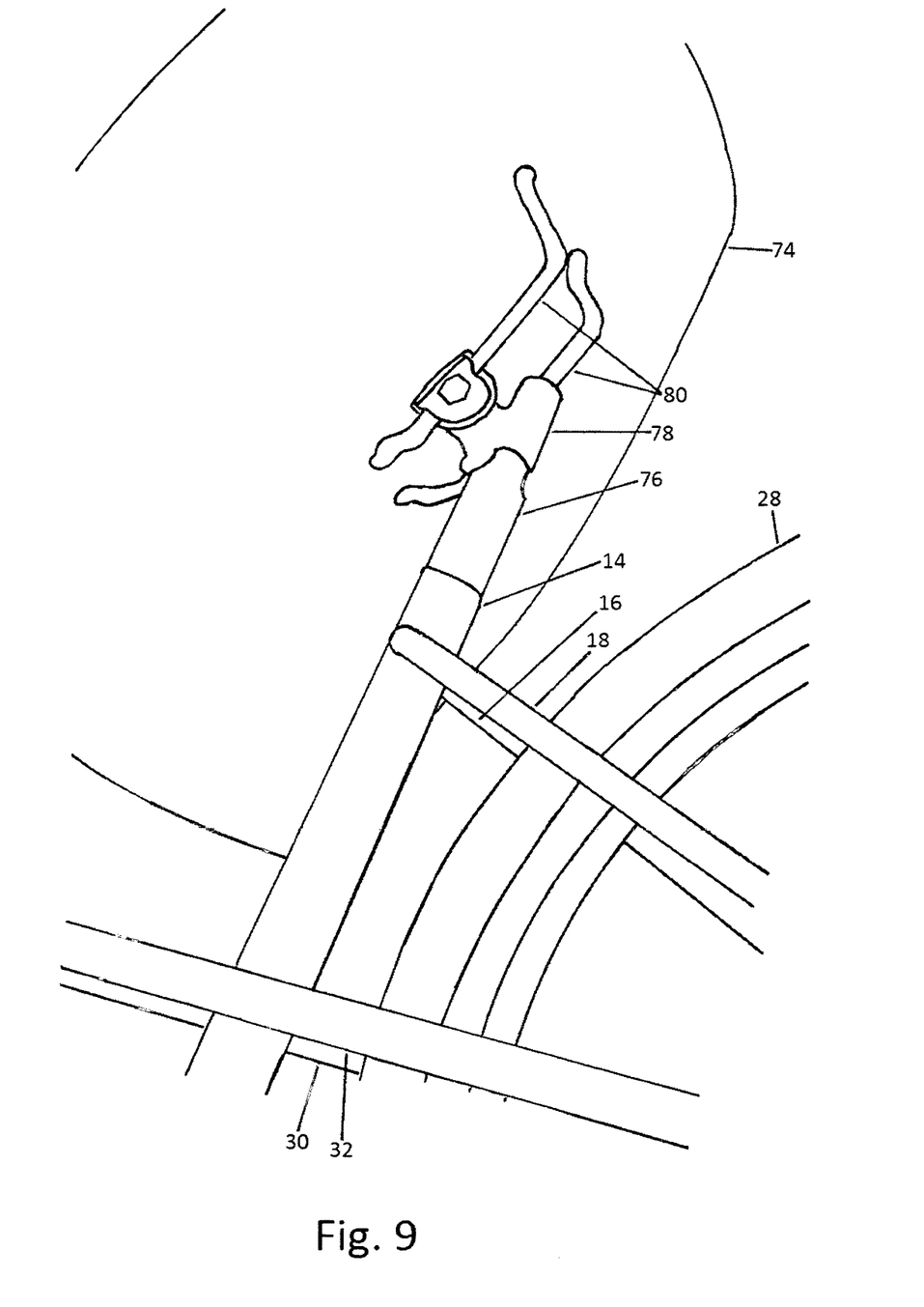

As shown in FIG. 4 and FIG. 9, a rear seat post 74 is inserted into and removably clamped to the rear seat tube 14. The rear seat post 76 is removably clamped to a rear seat clamp 78 which is removably clamped to the rear seat rails 80 which are connected to the seat 74.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A steering assembly for a bicycle comprising:
    a) a left front fork and a right front fork that are connected to each other, said front forks rotatably attached and removably attached to a head tube,
    b) a handlebar that is operably connected to the front forks, said handlebar mounted so that it rotates freely in a vertical space between an upper frame component and a lower frame component, said upper frame component being connected to said head tube, and said lower frame component being connected to said head tube, and
    c) a wraparound connector that is bolted to the front forks and bolted to the handlebar.

2. The steering assembly of claim 1, wherein the handlebar is mounted so that it rotates freely in the vertical space between the upper frame component and the lower frame component, wherein said upper frame component consists of left and right main side stays connected to the head tube and connected to left and right rear dropouts, and wherein said lower frame component consists of a down tube.

3. The steering assembly of claim 1, further comprising a vertical fork extender stem, said vertical fork extender stem connected to one or both of the front forks and bolted to said wraparound connector, said wraparound connector bolted to the handlebar.

4. The steering assembly of claim 3, wherein said wraparound connector is bolted to the vertical fork extender and said wraparound connector is bolted to the handlebar.

5. The steering assembly of claim 1, further comprising a braking system consisting of a braking mechanism, comprising rim calipers or a disc brake, that is operated by a controlling device mounted on the handlebar or on the frame.

* * * * *